United States Patent Office 3,578,602
Patented May 11, 1971

3,578,602
PHOTOCHROMIC COMPOUND
Hisatake Ono, Tiaki Osada, and Kuniko Kosuge, Asakashi, Japan, assignors to Fuji Shashin Film Kabushiki Kaisha, Kanagawa, Japan
Filed Aug. 29, 1968, Ser. No. 756,180
Claims priority, application Japan, Aug. 30, 1967, 42/55,662
Int. Cl. G02b 5/24
U.S. Cl. 252—300
7 Claims

ABSTRACT OF THE DISCLOSURE

A photochromic compound represented by the formula:

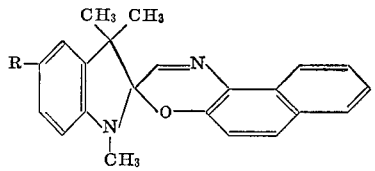

in which R can be hydrogen, a halogen, a cyan group, a nitro group, an alkyl group (1–8 carbons), an alkoxy group (1–8 carbons) or an alkoxy carbonyl group (1–8 carbons). Various resin and solvent systems which form photochromic compositions with the above compound are described in the specification. The compound or composition will vary from colorless (non-excited) to blue (under ultraviolet), and exhibits high reversibility.

BACKGROUND OF THE INVENTION

Field of the invention

This invention relates to a photochromic compound and more particularly to a photochromic compound capable of repeated color formation or discharging under the action of light.

Description of the prior art

Photochromism is a phenomenon that has drawn attention for some years. Photochromism is generally a reversible phenomenon illustrated by a compound which, when exposed to the radiation of light involving ultraviolet rays, such as sunlight, or the light of mercury lamp, rapidly changes in color and returns to its original color if the radiation is discontinued or the compound is stored in the dark. A compound illustrating this property is called a "photochromic compound." Various types of photochromic compounds have been synthesized but they generally have no structural similarity. 1,3,3-trimethylindolinobenzospiropyran derivatives represented by the following general structure:

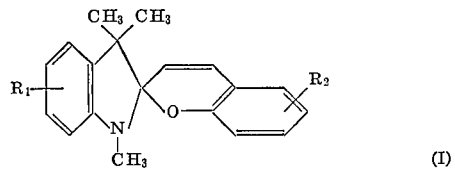
(I)

in which $R_1$ and $R_2$ are various substituents, have received much attention in the art. Generally, the photochromic compound represented by the Formula I change rapidly from a colorless state to blue when exposed to sunlight or ultraviolet radiation in a non-polar solvent such as benzene or toluene, and will return to the original colorless state by being allowed to stand in the dark or in the radiation of certain visible rays. However, these compounds are ordinarily red to red violet when dissolved in polar solvents such as ethyl alcohol, methyl alcohol, acetone, acetonitrile and dimethylformamide, and their photochromic property is no longer pronounced, even if ultraviolet radiation is radiated upon the solutions.

SUMMARY OF THE INVENTION

A photochromic compound represented by the formula:

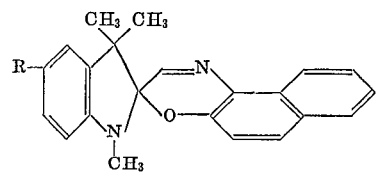

in which R can be hydrogen, a halogen, a cyan group, a nitro group, an alkyl group (1–8 carbons), an alkoxy group (1–8 carbons) or an alkoxy carbonyl group (1–8 carbons).

Typical resins which may be utilized in combination with the compounds shown above are: polyvinylacetate, polymethylmethacrylate, polystyrene, nitrocellulose, polyvinyl chloride, cellulose acetate and polyvinylpyrrolidone, ethylcellulose.

Typical solvents for the compounds shown above are: benzene, toluene, carbon disulfide, chloroform, ethylacetate, methylethylketone, acetone, ethyl alcohol, acetonitrile, tetrahydrofuran, dioxane, methyl ether of ethylene glycol, dimethyl formamide and dimethyl sulfoxide.

It is an object of the invention to provide a novel photochromic compound.

It is another object of the invention to provide a photochromic composition which contains the novel photochromic compound of the present invention.

A further object is to overcome the dependence of the photochromic property of a compound upon the solvent used.

DESCRIPTION OF THE PREFERRED EMBODIMENTS

Figure 1:
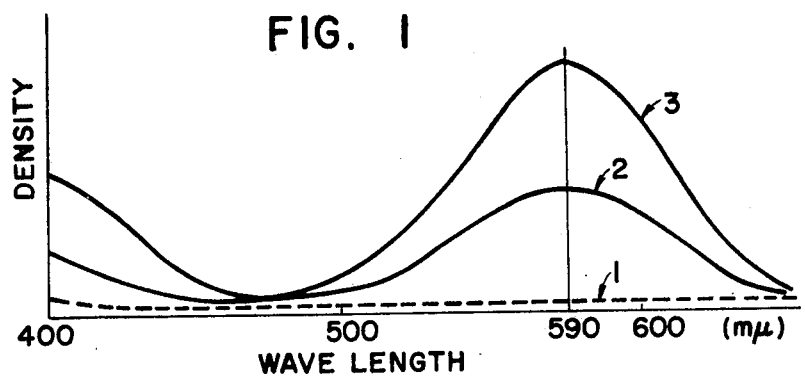
FIGS. 1 and 2 illustrate the spectrum change of solutions of the compound of the invention at various levels of radiation exposure.

In accordance with the invention, there is provided a novel photochromic compound represented by the following formula,

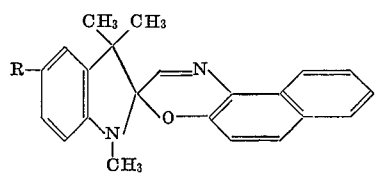

in which R is a hydrogen atom, a halogen atom, a cyano group, a nitro group, an alkoxy group of 1 to 8 carbon atoms, an alkyl group of 1 to 8 carbon atoms or an alkoxycarbonyl group of 1 to 8 carbon atoms.

The compound of this invention may be synthesized as follows: A mixture of 5-R-1,3,3-trimethyl-2-methyleneindoline and alpha-nitroso-beta-naphthol (equimolecular amounts) is refluxed in ethyl alcohol while bubbling nitrogen gas therein until reaction completion. The mixture is then cooled to deposit a brown crystal. Recrystallization of this resulting crystal from ethyl alcohol after filtering will produce the foregoing compound at yields of about 10–30%.

The compound obtained is then dissolved in solvents which are colorless at room temperature, such as: benzene, toluene, carbon disulfide, chloroform, ethyl acetate, methyl ethyl ketone, acetone, ethyl alcohol, methyl alcohol, acetonitrile, tetrahydrofuran, dioxane, methyl Cellosolve, morpholine, ethylene glycol, dimethylformamide and dimethyl sulfoxide. The dissolved compound is then "color-formed" to blue under ultraviolet radiation. The color forming density will be increased if the ultraviolet radiation is applied while cooling with ice.

The treated compound of the present invention may also be dissolved in solutions which are colorless or transparent, such as a polyvinyl acetate-acetone solution, a nitrocellulose-acetonitrile solution, a polyvinyl chloride-methyl ethyl ketone solution, a polymethyl methacrylate-acetone solution, a cellulose acetate-dimethylformamide solution, a polyvinylpyrrolidone-acetonitrile solution, a polystyrene-benzene solution, an ethyl cellulose-methylene chloride solution, and the like and this dissolution is performed independently of the kind of solvent or the resin utilized. The solution formed may be applied to a transparent support, such as cellulose triacetate, polyethylene terephthalate or baryta paper, and dried to obtain a photochromic material, which may be "color formed" by ultraviolet radiation to blue, and returned to colorless in about ten or more seconds by removing the source of ultraviolet radiation. It has been found that this back reaction from blue to colorless will proceed at a much higher speed than that in the case of a photochromic material using the compound (I) ($R_1$=5-H, $R_2$=6'-nitro).

A composition containing the compound of this invention can be utilized for photographic photochromic materials which comprise a support with a photochromic light-sensitive layer coated thereon, or a presensitized plate with a photochromic light-sensitive layer coated thereon. In addition, photochromic materials for furnitures may be formed wherein the compound is applied to glass or a curtain. Of course, the photochromic materials of the present invention may be utilized for filters and for decoration, such as lens or glass.

The composition of the invention may be characterized as follows: the composition is generally colorless independently of the kinds of solvent and resin used, but will be immediately color formed to blue ultraviolet radiation and returned to a colorless state in about ten or more seconds by removing the source of ultraviolet radiation, such a color change being repeatable numerous times.

Figure 2:
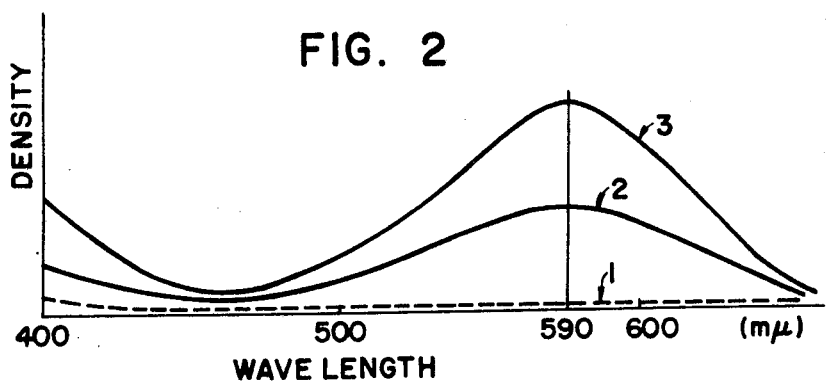

The spectrum change of the above-mentioned compound (under the influence of radiation containing ultraviolet rays) in a solution is shown in the accompanying drawing. The spectrum measurement visible part of the spectrum was carried out before exposure to ultraviolet radiation (1); after radiation for 4 seconds (2); and after radiation for 8 seconds (3). The compound used was such that R=H in the foregoing general formula. A benzene solution was used for FIG. 1 and an ethanol solution for FIG. 2. As the light source, a mercury lamp (Toshiba SHL-100) was used.

The details of the present invention will be illustrated by the following examples. These examples are illustrative only and are not intended to limit the invention.

EXAMPLE 1

| | Percent | |
|---|---|---|
| | Found | Calculated |
| Elementary material analysis: | | |
| C | 80.42 | 80.46 |
| H | 6.85 | 6.14 |
| N | 8.78 | 8.53 |

6.9 g. of 1,3,3-trimethyl-2-methyleneindoline and 6.9 g. of alpha-nitroso-beta-naphthol were dissolved in 100 ml. of ethyl alcohol and refluxed for 2 hours while bubbling nitrogen gas therein. After the reaction, the excess ethyl alcohol was distilled off to a level of about 25% and the reaction mixture was then allowed to stand at room temperature to deposit a crude crystal of 1,3,3-trimethylspiro(indolino-2,3'-naphtho(2,1-b)(1,4)-oxazine). The crude crystal obtained was purified by recrystallization from ethyl alcohol to give 1.9 g. of a yellow crystal melting at 117–119° C.

Solution of the resultant material in toluene, carbon disulfide, chloroform, ethyl acetate, methyl ethyl ketone, acetone, ethyl alcohol, methyl alcohol, acetonitrile, tetrahydrofuran, dioxane, "methyl Cellosolve," morpholine, ethylene glycol, dimethylformamide and dimethyl sulfoxide were colorless under ordinary conditions, but were blue color formed by ultraviolet radiation and directly returned to a colorless state upon removal of the ultraviolet source.

Solutions of the thus treated material in polyvinyl acetate-acetone, nitrocellulose-acetonitrile polyvinyl chloride-methyl ethyl ketone, polymethyl methacrylate acetone, cellulose acetate-dimethyl formamide, cellulose acetate-dimethylformamide, polyvinylpyrrolidone-acetonitrile, polystyrene-benzene, ethyl cellulose-methylene chloride, and the like were coated onto individual supports of baryta paper, cellulose triacetate and polyethylene terephthalate and dried. The coated supports were observed to be blue under ultraviolet radiation, and would rapidly return to a colorless state by removal of the ultraviolet source.

EXAMPLE 2

| | Percent | |
|---|---|---|
| | Found | Calculated |
| Elementary material analysis: | | |
| C | 80.81 | 80.67 |
| H | 5.97 | 6.48 |
| N | 8.09 | 8.18 |

2.9 g. of 1,3,3,5-tetramethyl-2-methyleneindoline and 2.8 g. of alpha-nitroso-beta-naphthol were dissolved in 60 ml. of ethyl alcohol and refluxed for 2 hours while bubbling nitrogen gas therein. After distilling off excess ethyl alcohol, the reaction mixture was cooled to deposit a crude crystal of 1,3,3,5 - tetramethylspiro(indolino - 2,3' - naphtho(2,1-b)(1,4)-oxazine). When the crude crystal was purified by recrystallization from ethyl alcohol, 1.2 g. of a light yellow crystal was obtained, melting at 152–154° C.

The properties of this compound were the same as those described in Example 1.

EXAMPLE 3

| | Percent | |
|---|---|---|
| | Found | Calculated |
| Elementary material analysis: | | |
| C | 77.13 | 77.07 |
| H | 6.38 | 6.19 |
| N | 7.11 | 7.82 |

3.3 g. of 5-methoxy-1,3,3-trimethyl-2-methyleneindoline and 2.8 g. of alpha-nitroso-beta-naphthol were refluxed in 60 ml. of ethyl alcohol for 2 hours while bubbling nitrogen gas therein. After the reaction, the excess ethyl alcohol was distilled off and the reaction mixture was cooled to give a crude crystal of 5-methoxy-1,3,3-trimethylspiro(indolino - 2,3' - naphtho(2,1 - b)(1,4) - oxazine). When the crude crystal was recrystallized from ethyl alcohol, after filtering, 0.9 g. of light brown crystal was obtained, melting at 130–132° C.

EXAMPLE 4

| | Percent | |
|---|---|---|
| | Found | Calculated |
| Elementary material analysis: | | |
| C | 72.51 | 72.83 |
| H | 5.38 | 5.24 |
| N | 7.18 | 7.72 |

2.1 g. of 5-chloro-1,3,3-trimethyl-2-methyleneindoline and 1.8 g. of alpha-nitroso-beta-naphthol were refluxed in 30 ml. of ethyl alcohol for 2 hours, as heretofore described. After distilling off excess ethyl alcohol to a 25% level, the reaction mixture was cooled to obtain 2.8 g. of a crude crystal of 5-chloro-1,3,3-trimethylspiro(indoline-2,3'-naphtho(2,1-b)(1,4)-oxazine). When the crude crystal was recrystallized from ethyl alcohol, 1.9 g. of a light yellow-white crystal was obtained, melting at 174–177° C. The properties of the resulting compound were the same as those of Example 1.

What we claim is:
1. A photochromic compound represented by the following general formula:

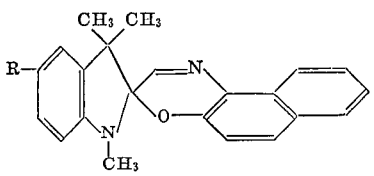

wherein R is a member selected from the group consisting of a hydrogen atom, a halogen atom, a cyan group, a nitro group, an alkyl group having from 1 to 8 carbon atoms, an alkoxy group having from 1 to 8 carbon atoms and an alkoxycarbonyl group having from 1 to 8 carbon atoms.

2. The compound of claim 1 which is 1,3,3-trimethylspiro[indolino-2,3'-naphtho[2,1-b](1,4)-oxazine].

3. The compound of claim 1 which is 1,3,3,5-tetramethylspiro[indolino-2,3'-naphtho[2,1-b](1,4)-oxazine].

4. The compound of claim 1 which is 5-methoxy-1,3,3-trimethylspiro[indolino-2,3'-naphtho[2,1](1,4)-oxazine].

5. A photochromic composition comprising a binder or solvent and a compound represented by the following general formula:

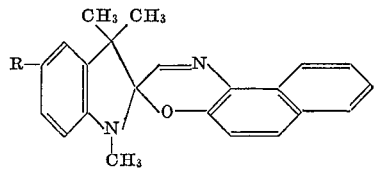

wherein R is a member selected from the group consisting of a hydrogen atom, a halogen atom, a cyan group, a nitro group, an alkyl group having from 1 to 8 carbon atoms, an alkoxy group having from 1 to 8 carbon atoms and an alkoxycarbonyl group having from 1 to 8 carbon atoms.

6. The photochromic composition claimed in claim 5 wherein the binder comprises a member selected from the group consisting of polyvinylacetate, polymethylmethacrylate, polystyrene, nitrocellulose, polyvinylchloride, celluloseacetate, polyvinylpyrrolidone and ethylcellulose.

7. The photochromic composition claimed in claim 5 wherein said solvent comprises a member selected from the group consisting of benzene, toluene, carbon disulfide, chloroform, ethyl acetate, methylethylketone, acetone, ethyl alcohol, acetonitrile, tetrahydrofuran, dioxane, the methyl ether of ethylene glycol, dimethyl formamide and dimethyl sulfoxide.

References Cited
UNITED STATES PATENTS 3,100,778   8/1963   Berman _____ 96—90

GEORGE F. LESMES, Primary Examiner

J. P. BRAMME, Assistant Examiner

U.S. Cl. X.R.

260—244; 106—176; 96—90